United States Patent
Yang et al.

(10) Patent No.: US 10,045,376 B2
(45) Date of Patent: Aug. 7, 2018

(54) CHANNEL ACCESS PROCEDURE AND QOS PROVISIONING FOR UPLINK LAA

(71) Applicant: MEDIATEK INC., Hsinchu (TW)

(72) Inventors: Weidong Yang, San Diego, CA (US);
Bo-Si Chen, Keelung (TW);
Chien-Chang Li, Penghu County (TW); Yih-Shen Chen, Hsinchu County (TW); Pavan Santhana Krishna Nuggehalli, Mountain View, CA (US)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/433,492

(22) Filed: Feb. 15, 2017

(65) Prior Publication Data
US 2017/0238342 A1    Aug. 17, 2017

Related U.S. Application Data

(60) Provisional application No. 62/295,589, filed on Feb. 16, 2016, provisional application No. 62/315,697, filed on Mar. 31, 2016.

(51) Int. Cl.
*G01R 31/08* (2006.01)
*H04L 12/28* (2006.01)
(Continued)

(52) U.S. Cl.
CPC ........... *H04W 74/04* (2013.01); *H04W 16/14* (2013.01); *H04W 72/042* (2013.01);
(Continued)

(58) Field of Classification Search
CPC ..... H04W 76/10; H04W 80/02; H04W 72/10; H04W 72/1215; H04W 72/12
See application file for complete search history.

(56) References Cited

U.S. PATENT DOCUMENTS

2011/0261747 A1* 10/2011 Wang .................... H04B 7/155
  370/315
2012/0044805 A1*  2/2012 Lee ................... H04W 28/0268
  370/230
(Continued)

FOREIGN PATENT DOCUMENTS

CN      104717687 A     6/2015
CN      104812032 A     7/2015
(Continued)

OTHER PUBLICATIONS

International Search Report and Written Opinion of International Search Authority for PCT/CN2017/073755 dated May 17, 2017 (11 pages).

(Continued)

*Primary Examiner* — Faruk Hamza
*Assistant Examiner* — Abu-Sayeed Haque
(74) *Attorney, Agent, or Firm* — Imperium Patent Works; Zheng Jin

(57) ABSTRACT

A method of channel access procedure and QoS provisioning is proposed. When more than one user equipments (UEs) contend uplink transmission for a given time slot in an unlicensed band, uplink listen-before-talk (LBT) scheme should perform in a proper way to reflect service prioritization. The base station first determines the Channel Access Priority (CAP) for uplink LBT, and then signals such CAP to the UE via PDCCH. Upon receiving the CAP, the UE performs LBT procedure with corresponding CAP before uplink transmission. For example, the CAP can be determined based on QoS class identifier (QCI) of the radio bearer or based on the MAC layer logical channel prioritization (LCP).

20 Claims, 6 Drawing Sheets

(51) Int. Cl.
    H04L 5/14      (2006.01)
    H04J 3/00      (2006.01)
    H04W 74/04     (2009.01)
    H04W 72/04     (2009.01)
    H04W 76/02     (2009.01)
    H04W 16/14     (2009.01)
    H04W 72/12     (2009.01)
    H04W 72/08     (2009.01)
    H04W 76/10     (2018.01)

(52) U.S. Cl.
    CPC ..... *H04W 72/087* (2013.01); *H04W 72/1268* (2013.01); *H04W 76/02* (2013.01); *H04W 76/10* (2018.02)

(56) References Cited

U.S. PATENT DOCUMENTS

| | | | |
|---|---|---|---|
| 2014/0204800 A1* | 7/2014 | Moulsley | H04L 5/0023 370/254 |
| 2015/0071220 A1 | 3/2015 | Luo et al. | 370/329 |
| 2015/0085797 A1 | 3/2015 | Ji et al. | 370/329 |
| 2015/0092703 A1 | 4/2015 | Xu et al. | 370/329 |
| 2015/0092758 A1 | 4/2015 | Chen et al. | 370/336 |
| 2015/0103715 A1 | 4/2015 | Chen et al. | 370/311 |
| 2015/0131578 A1* | 5/2015 | Baek | H04W 72/0406 370/329 |
| 2015/0148046 A1* | 5/2015 | Lim | H04W 36/22 455/444 |
| 2016/0081010 A1 | 3/2016 | Seok | 370/329 |
| 2017/0094485 A1* | 3/2017 | Saxena | H04L 41/0813 |
| 2017/0238233 A1* | 8/2017 | Oh | H04W 40/04 370/328 |

FOREIGN PATENT DOCUMENTS

| | | |
|---|---|---|
| CN | 104994591 A | 10/2015 |
| CN | 105101446 A | 11/2015 |
| WO | WO2014178678 A1 | 11/2014 |

OTHER PUBLICATIONS

ETSI EN 301 893 V1.8.1 Broadband Radio Access Networks (BRAN); 5 GHz high performance RLAN; Harmonized EN covering the essential requirements of article 3.2 of the R&TTE Directive; Mar. 31, 2015.

International Search Report and Written Opinion of International Search Authority for PCT/CN2017/073795 dated May 4, 2017 (11 pages).

* cited by examiner

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

~310

| Priority class | $m_p$ | $CW_{min,p}$ | $CW_{max,p}$ | $T_{mcot,p}$ | allowed $CW_p$ sizes |
|---|---|---|---|---|---|
| 1 | 1 | 1 | 3 | 2 ms | {1,3} |
| 2 | 1 | 3 | 7 | 3 ms | {3,7} |
| 3 | 3 | 7 | 15 | 8 or 10 ms | {7,15} |
| 4 | 7 | 15 | 63 | 8 or 10 ms | {15,31,63} |

~320

QCI VALUES FOR BEARERS

| QCI | Resource Type | Priority | Packet Delay Budget (ms) | Packet Error Loss Rate | Example Services |
|---|---|---|---|---|---|
| 1 | GBR | 2 | 100 | $10^{-2}$ | Conversational Voice |
| 2 | GBR | 4 | 150 | $10^{-3}$ | Conversational Video (live streaming) |
| 3 | GBR | 3 | 50 | $10^{-3}$ | Real-time gaming |
| 4 | GBR | 5 | 300 | $10^{-6}$ | Non-conversational video (buffered streaming) |
| 5 | Non-GBR | 1 | 100 | $10^{-6}$ | IMS Signaling |
| 6 | Non-GBR | 6 | 300 | $10^{-6}$ | Video (buffered streaming) |
| 7 | Non-GBR | 7 | 100 | $10^{-3}$ | Voice, Video (live streaming), interactive gaming |
| 8 | Non-GBR | 8 | 300 | $10^{-6}$ | TCP-based (WWW, email, FTP); privileged subscriber |
| 9 | Non-GBR | 9 | 300 | $10^{-6}$ | TCP-based (WWW, email, FTP); non-privileged subscriber |

FIG. 5

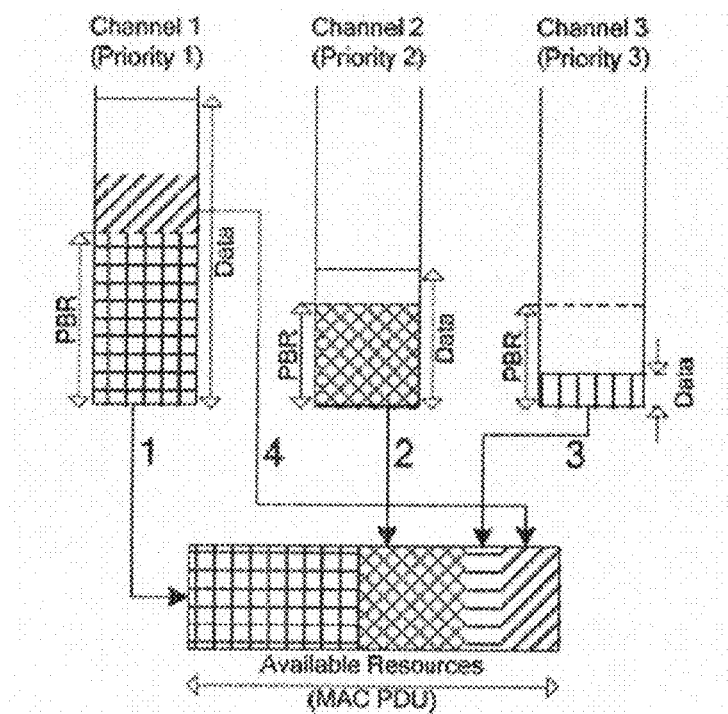

FIG. 6

CHANNEL ACCESS PROCEDURE AND QOS PROVISIONING FOR UPLINK LAA

CROSS REFERENCE TO RELATED APPLICATIONS

This application claims priority under 35 U.S.C. § 119 from U.S. Provisional Application No. 62/295,589, entitled "Channel Access Procedure for Uplink LAA," filed on Feb. 16, 2016; U.S. Provisional Application No. 62/315,697, entitled "QoS Provisioning for Uplink LAA," filed on Mar. 31, 2016, the subject matter of which is incorporated herein by reference.

TECHNICAL FIELD

The disclosed embodiments relate generally to wireless network communications, and, more particularly, to channel access procedure and QoS provisioning in uplink licensed assisted access (LAA) wireless communications systems.

BACKGROUND

At licensed spectrum, there is only one owner of that spectrum in an area, which facilitates to create a single depot of information for base stations (eNBs). For example, eNBs under one operator can exchange channel state information and scheduling information. With single cell scheduling, radio resource access is typically controlled by eNB in an LTE system. In Coordinated Multipoint Operation (CoMP) and eCoMP, centralized or distributed scheduling can be used to coordinate the transmissions from eNBs with a direct goal to achieve either higher SINRs or interference mitigation. A salient point about (e)CoMP is identified as information exchange is through a network link which is either proprietary or standard based (e.g. X2). Typically, the exchanged information carried over those links need to happen with latency up to tens of milliseconds. In summary, interference handling is a central issue in wireless communications and the sole ownership of licensed spectrum has enabled information exchange among eNBs under one operator to achieve effective interference handling.

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA".

In LAA, an established communication protocol such as LTE can be used over the licensed spectrum to provide a first communication link, and LTE can also be used over the unlicensed spectrum to provide a second communication link. Furthermore, while LAA only utilizes the unlicensed spectrum to boost downlink through a process of carrier aggregation, enhanced LAA (eLAA) allows uplink streams to take advantage of the unlicensed band as well. The unlicensed band could be ISM band (Industrial Scientific Medical Band) at 2.4 GHz or 5 GHz, or it could be CBRS band (Citizens Broadband Radio Service band) at 3.5 GHz as long as no spectrum auction procedure takes place. Although eLAA is straightforward in theory, practical usage of eLAA while complying with various government regulations regarding the usage of unlicensed spectrum is not so straightforward. As no entity, network operator or otherwise, has a monopoly of using a certain frequency spectrum in an area, there can be wireless communication equipments outside the control of an operator which interfere with that operator's equipments. Furthermore, there is no single depot where information about channel states and traffic converge. As a result, the interference handling schemes developed at licensed spectrum such as (e)CoMP, (e)ICIC, etc., may no longer work at unlicensed spectrum. Hence, there is a need to coordinate the transmissions from equipments made by different eNB vendors, or allow collaboration among equipments made by different eNB vendors.

Listen-before-talk (LBT) schemes are discussed for solving the issue caused from the coexistence between WiFi and Licensed Assisted Access (LAA) and between LAA and LAA. To facilitate efficient and fair spectrum sharing, the dynamic spectrum sharing mechanism LBT need to be supported for both downlink LAA and uplink LAA based on regulation rules in each country. Though LTE applies request-and-grant-based uplink scheduling principle, UL LBT is still needed. In current LTE system, there are 4 subframe time difference between PDCCH (grant command from eNB) and PUSCH (uplink transmission by UE). UE has to perform UL LBT to confirm channel ownership. When more than one UEs contend uplink transmission for a given time slot in unlicensed band, uplink LBT scheme should perform in a proper way to reflect service prioritization.

SUMMARY

A method of channel access procedure and QoS provisioning is proposed. When more than one user equipments (UEs) contend uplink transmission for a given time slot in an unlicensed band, uplink listen-before-talk (LBT) scheme should perform in a proper way to reflect service prioritization. The base station first determines the Channel Access Priority (CAP) for uplink LBT, and then signals such CAP to the UE via PDCCH. Upon receiving the CAP, the UE performs LBT procedure with corresponding CAP before uplink transmission. For example, the CAP can be determined based on QoS class identifier (QCI) of the radio bearer or based on the MAC layer logical channel prioritization (LCP).

In one embodiment, a base station establishes a data radio bearer (DBR) with a user equipment (UE) in a wireless communications network. The DBR is associated with an Evolved Packet System (EPS) bearer and a logical channel. The base station schedules an uplink data transmission for the UE, and determining a channel access priority class (CAPC) for the uplink data transmission from the UE. The base station transmits uplink scheduling information over a physical downlink control channel (PDCCH) to the UE. The uplink scheduling information comprises the determined CAPC for gaining uplink access. The base station receives the uplink data transmission from the UE over an unlicensed frequency band.

In another embodiment, a user equipment (UE) establishes a data radio bearer (DBR) with a base station in a wireless communications network. The DBR is associated with an Evolved Packet System (EPS) bearer and a logical channel. The UE receives uplink scheduling information from the base station over a physical downlink control channel (PDCCH). The uplink scheduling information comprises a channel access priority class (CAPC) for uplink data transmission from the UE. The UE performs a listen before talk (LBT) procedure applied with a set of LBT parameters associated with the CAPC. The UE transmits the uplink data transmission over an unlicensed frequency band upon successful completion of the LBT procedure.

Other embodiments and advantages are described in the detailed description below. This summary does not purport to define the invention. The invention is defined by the claims.

BRIEF DESCRIPTION OF THE DRAWINGS

FIG. 5 illustrates a first example of QoS provisioning in LTE based on QoS class identifier (QCI).

FIG. 6 illustrates a second example of QoS provisioning in LTE based on Logic Channel Prioritization (LCP).

DETAILED DESCRIPTION

Reference will now be made in detail to some embodiments of the invention, examples of which are illustrated in the accompanying drawings.

Figure 1:
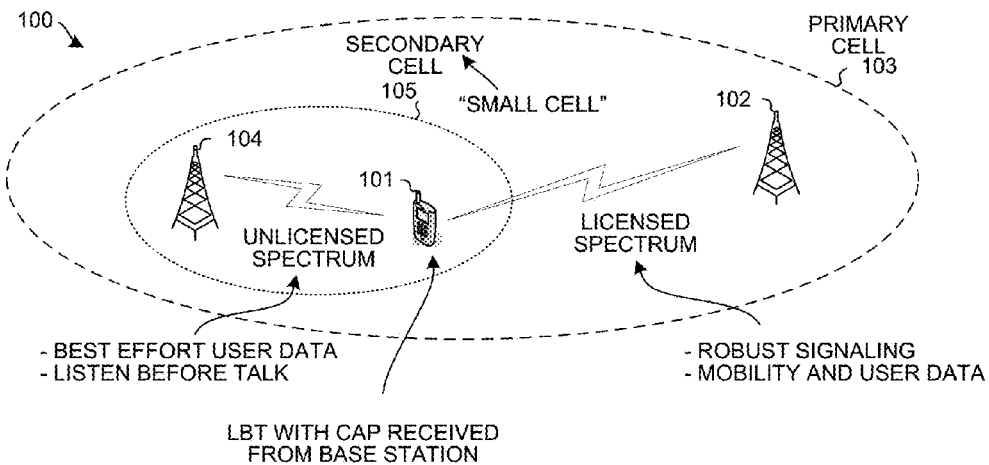
FIG. 1 illustrates an exemplary Licensed Assisted Access (LAA) wireless communications system 100 that adopts listen before talk (LBT) channel access mechanism with QoS provisioning in accordance with embodiments of the current invention.

FIG. 1 illustrates an exemplary Licensed Assisted Access (LAA) wireless communications system 100 that adopts listen before talk (LBT) channel access mechanism with QoS provisioning in accordance with embodiments of the current invention. Wireless communications system 100 includes one or more wireless communication networks, and each of the wireless communication networks has base infrastructure units, such as 102 and 104. The base infrastructure units may also be referred to as an access point, an access terminal, a base station, eNB, or by other terminology used in the art. Each of the base stations 102 and 104 serves a geographic area. The geographic area served by wireless communications stations 102 and 104 overlaps in this example.

Base station 102 is a licensed base station that communicates with UE 101 via a licensed frequency band. In one example, base station 102 communicates with UE 101 via Long-Term Evolution (LTE) wireless communication. Base station 102 provides wireless communication to multiple UEs within primary cell 103. Base station 104 is an unlicensed base station that communicates with UE 101 via an unlicensed frequency band. In one example, base station 104 communicates with UE 101 via LTE wireless communication. Base station 104 can communicate with multiple UEs with a secondary cell 105. Secondary cell 105 is also referred to as a "small cell". Note that, FIG. 1 is an illustrative plot. The base station 102 and base station 104 can be co-located geographically.

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. A LAA network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in a LAA network. The LAA network not only provides additional bandwidth for greater overall data communication, but also provide consistent data connectivity due to the presence of two separate data links. Having multiple data links available increases the probability that the UE will be able to achieve proper data communication with at least one base station at any given moment. While utilization of the unlicensed spectrum provides more available bandwidth, the use of the unlicensed spectrum faces practical problems that need to be addressed.

To facilitate efficient and fair spectrum sharing, a dynamic spectrum sharing mechanism called listen-before-talk (LBT) is supported based on regulation rules in each country. However, the performance of LAA with LBT mechanism may not satisfy the purpose of efficient and fair spectrum sharing. In the example of FIG. 1, for downlink (DL) LAA, eNB 104 performs LBT to contend channel ownership and initiates data transmission. For uplink (UL) LAA, both eNB 104 and UE 101 perform LBT procedure, eNB 104 performs LBT for Physical Downlink Control Channel (PDCCH) transmission, and UE 101 performs LBT for Physical Uplink Shared Channel (PUSCH) transmission. In accordance with one novel aspect, when more than one UEs contend uplink transmission for a given time slot in unlicensed band, uplink LBT scheme should perform in a proper way to reflect service prioritization. The base station first determines the Channel Access Priority (CAP) for uplink LBT, and then signals such CAP to the UE via PDCCH. Upon receiving the CAP, the UE performs LBT procedure with corresponding CAP before uplink transmission.

Figure 2:
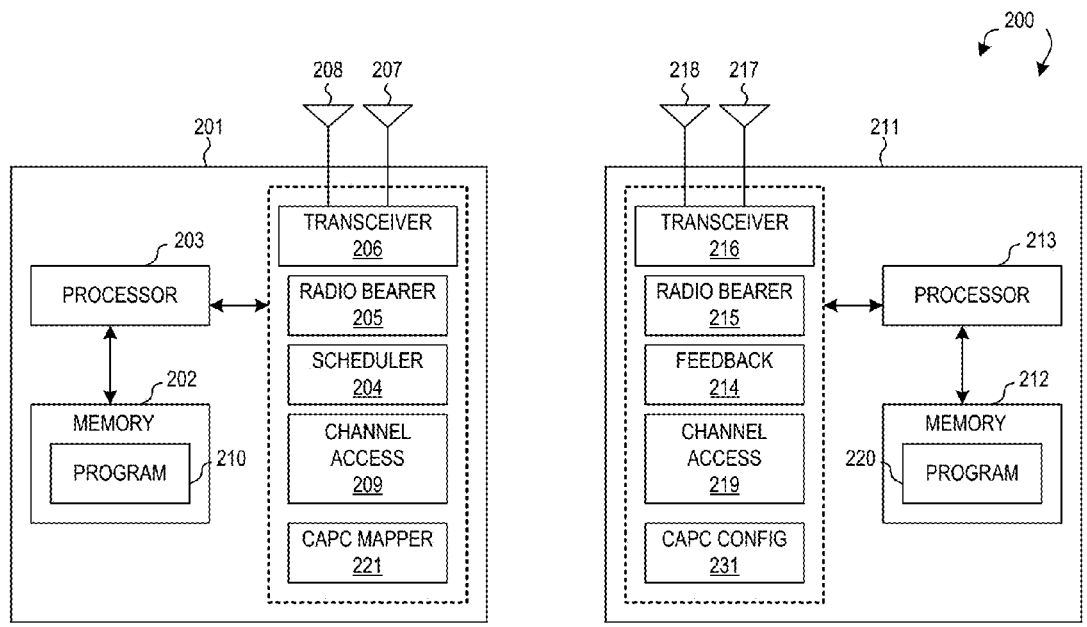
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a radio bearer handling circuit 205, a scheduler 204, a channel access circuit 209, and a CAPC mapper 221. Wireless device 211 is a user equipment that includes a radio bearer handling circuit 215, a feedback circuit 214, a channel access circuit 219, and a CAPC configuration circuit 231. The different functional modules and circuits can be implemented and configured by software, firmware, hardware, and any combination thereof. The function modules and circuits, when executed by the processors 203 and 213 (e.g., via executing program codes 210 and 220), allow wireless device 201 and wireless device 211 to perform embodiments of the present invention.

In one example, the base station establishes a data radio bearer with the UE via radio bearer handing circuit 205, schedules downlink and uplink transmission for UEs via scheduler 204, performs downlink LBT procedure via channel access circuit 209, and determines CAPC for the UE via CAPC mapper 221. The user equipment establishes a data radio bearer with the base station via radio bearer handing circuit 215, provides feedback information to the base station via feedback circuit 214, performs uplink LBT procedure via channel access circuit 219, and obtains CAPC info via CAPC configuration circuit 231.

Based on LBT procedure, a transmitter is allowed to transmit radio signals onto the shared wireless medium depending on clear channel assessment (CCA) sensing and a deferral or backoff procedure for channel access contention as long as the CCA indicates the channel is idle. The LBT procedure allows the transmitter to gain access to the shared wireless medium, e.g., to obtain a transmitting opportunity (TXOP) for transmitting radio signals onto the shared wireless medium. The basic assumption of LBT is that a packet collision can be detected if a device transmits signal under the channel busy condition when the received signal level is higher than a CCA level, e.g., an energy detection (ED) threshold or a preamble detection (PD) threshold. Under Category 4 (LBT with random backoff with a contention window of variable size), the transmitting entity draws a random number N within a contention window (CW). The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. A Category 4 LBT involves both an initial CCA and an extended CCA (eCCA) channel access procedure.

Furthermore, LBT is a form of differentiated QoS. In one embodiment, traffic can be classified into four access categories (AC): AC_VI (for video), AC_VO (for voice), AC_BE (for best effort), and AC_BK (for background). Each device is expected to access the channel based on the AC-specific LBT parameters to which the traffic belongs. The smaller the initial CCA period, the contention window size, the eCCA defer period, the eCCA slot duration, and the higher the CCA/eCCA ED threshold, CCA/eCCA PD threshold, a transmitting node contends for channel access more aggressively. The four access categories are also referred to as channel access priority class (CAPC) for the purpose of uplink LBT.

For unlicensed channel access, a maximum channel occupancy time (MCOT) including DL transmission from one eNB and UL transmission to the same eNB is introduced. A transmission sequence is defined as a number of subframes including possible partial subframes for DL and/or UL within a MCOT. The transmission in the first subframe among the transmission sequence is conducted after a Category 4 LBT. The node performing the Category 4 LBT can be either an eNB or a UE. A sequence of transmission including DL and/or UL can follow the transmission on the first subframe. The transmission sequence within the MCOT can be initiated by either a DL transmission or an UL transmission. The duration of a transmission sequence is called transmission duration.

Figures 3, 4:
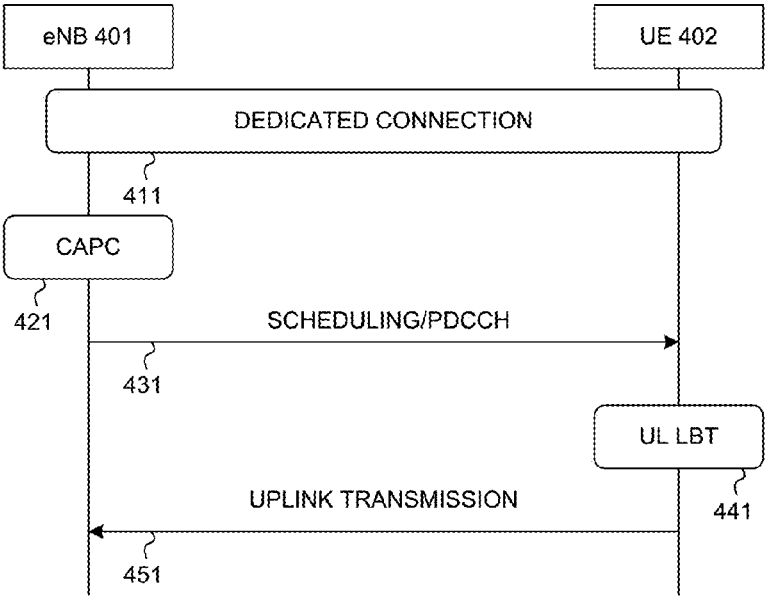
FIG. 3 illustrates one embodiment of channel access priority class (CAPC) for uplink LBT procedure.
FIG. 4 illustrates one embodiment of determining and configuring CAPC for uplink LBT procedure in accordance with one novel aspect.

FIG. 3 illustrates one embodiment of channel access priority class (CAPC) for DL/UL LBT procedure. In LTE Release-13, when traffics at different priority classes are sent in the downlink, rules are defined for multiplexing traffics at different priority classes and the allowed maximum transmission duration. Specifically, if a DL transmission burst with PDSCH is transmitted for which channel access has been obtained using LBT priority class X, the eNB shall ensure that 1) the transmission duration shall not be longer than the minimum possible duration needed to transmit all available buffered traffic corresponding to LBT priority class<=X; 2) the transmission duration shall not be longer than the MCOT for priority class X; 3) additional traffic corresponding to LBT priority class>X may only be included in the DL transmission burst once inclusion of traffic corresponding to LBT priority class<=X has been exhausted. In such case, the eNB should maximize occupancy of the remaining transmission resources in the DL transmission burst with this additional traffic.

Similarly, when traffics at different priority classes are sent in the uplink, e.g., when an eNB sends an uplink grant to the UE, it may be beneficial that eNB chooses the LBT parameter set applied to UE. In the example of FIG. 3, there are four priority classes 1-4 for downlink and uplink LBT as depicted in table 310 and table 320, and each priority class is associated with a set of LBT parameters: $m_p$ (deferred duration in LBT), $CW_{MIN}$ (minimum contention window), $CW_{MAX}$ (maximum contention window), $T_{MCOT}$ (MCOT) and allowed CW sizes. For uplink transmission over PUSCH, the UE constructs a MAC PDU based on the uplink grant notification from lower layers (e.g., PDCCH) which is to be transmitted over an unlicensed carrier. The MAC PDU has data belong to DRBs and logical channels. The UE performs LBT procedure using LBT parameters associated with a corresponding CAPC. The CAPC is determined by the eNB and signaled to the UE via PDCCH associated with the uplink grant.

FIG. 4 illustrates one embodiment of determining and configuring CAPC for uplink LBT procedure in accordance with one novel aspect. In step 411, a base station eNB 401 and a user equipment UE 402 establishes a dedicated connection with each other. For example, the dedicated connection is a dedicated radio bearer (DRB) associated a quality class identifier (QCI). Each DRB has a one-to-one mapping to a logical channel belonging to a logical channel group (LCG). In step 421, eNB 401 determines the CAPC for UE 402 for LBT parameters to be applied in the subsequent uplink transmission. For example, the CAPC can be determined based on the QCI of the DRB or based on the MAC layer logical channel prioritization (LCP). In step 431, eNB 401 sends uplink scheduling information to UE 402 over a PDCCH. The PDCCH also carries the CAPC information determined by the base station. Alternatively, eNB 401 configures the CAPC as part of the logic channel configuration that is sent to UE 402 via radio resource control (RRC) signaling. In step 441, UE 402 receives the uplink scheduling information including the CAPC and starts to initiate uplink transmission by performing an uplink LBT procedure. The LBT procedure is applied with a set of LBT parameters that is associated with the received CAPC. In step 451, upon LBT completion, UE 402 transmits uplink data over PUSCH.

FIG. 5 illustrates a first example of QoS provisioning in LTE based on QoS class identifier (QCI). In LTE, from QoS perspective, each data radio bearer (DRB) has a one-to-one mapping with an Evolved Packet System (EPS) bearer, which has an EPS bearer QoS profile that includes a Quality Class Identifier (QCI). For each LTE service, it is attached to a specific QCI value as depicted by table 500 of FIG. 5. For example, IMS signaling and VoLTE flow are assigned with different QCI. For each EPS bearer, QCI value is provided during bearer setup in non-access stratum (NAS) messaging. In addition, it is also possible to modify the QCI value associated with an EPS bearer (e.g., using the NAS layer EPS modification process).

FIG. 6 illustrates a second example of QoS provisioning in LTE based on Logic Channel Prioritization (LCP). LCP is used in media access control (MAC) layer for QoS differentiation. In LTE, each DRB has a one-to-one mapping with a logical channel. The radio resource control (RRC) layer controls the scheduling of the uplink data by configuring the following parameters for each logical channel: Priority, Prioritized Bit Rate (PBR), and Bucket Size Duration (BSD). As depicted in FIG. 6, UE applies the logical channel prioritization procedure to construct a MAC PDU or Transport Block (TB) based on these configured values. The resulting MAC PDU can contain data from different logical channels or DRBs.

Figures 7, 8:
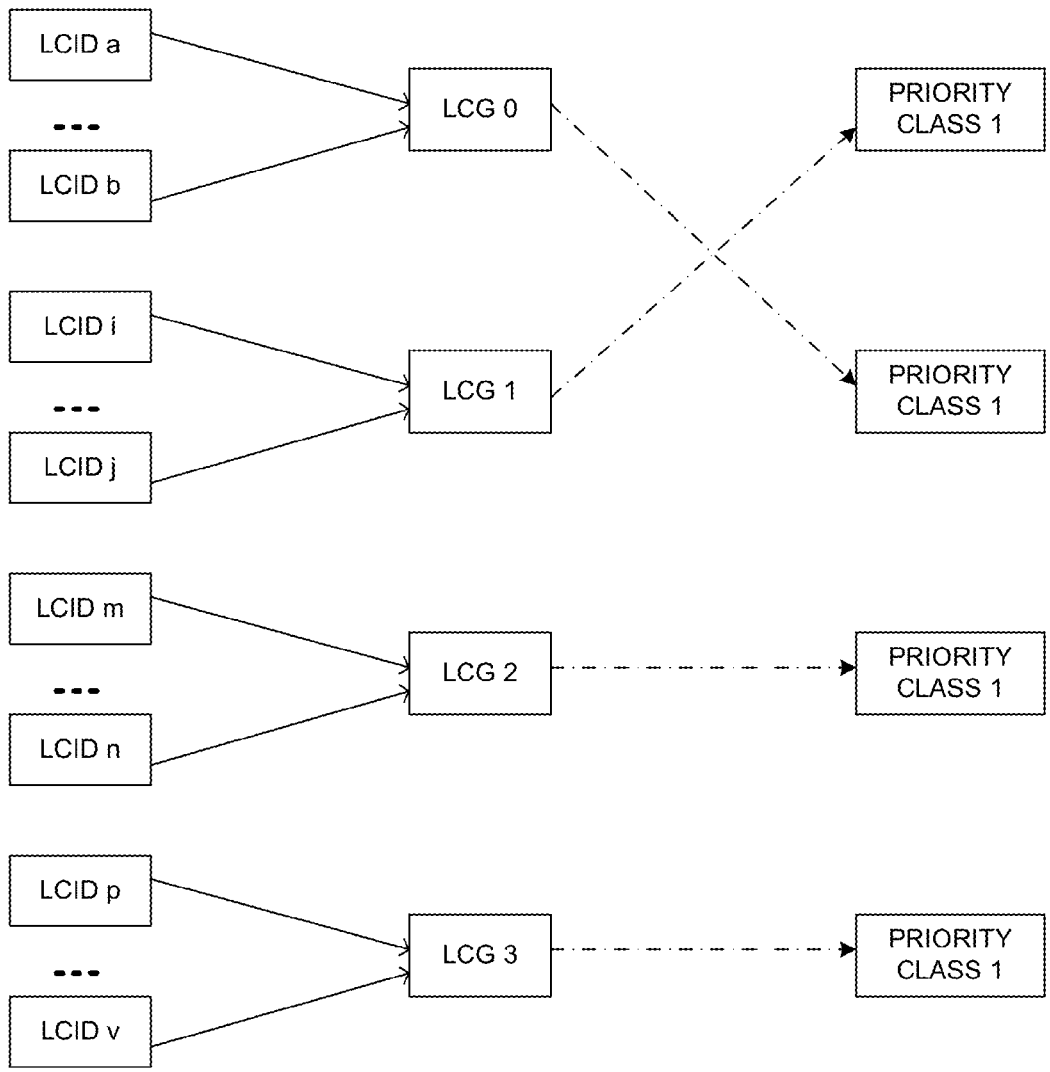
FIG. 7 illustrates a first embodiment of CAPC determination based on QCI.
FIG. 8 illustrates a second embodiment of CAPC determination based on LCP.

FIG. 7 illustrates a first embodiment of CAPC determination based on QCI. In LTE Release-13, for downlink LAA, four channel access priority classes (CAPC) have been defined and a mapping between CAPC and QCI has been provided. Similar priority classes in the uplink are defined with a mapping between CAPC and QCI, as depicted in Table 700 of FIG. 7. Such table can be configured in the 3GPP specification, or be signaled in broadcast or by dedicated RRC signaling, or by NAS messaging. The CAPC of an uplink MAC PDU is then determined by the QCI value of the corresponding content.

FIG. 8 illustrates a second embodiment of CAPC determination based on LCP. Each logical channel for each DRB, identified by a logical channel ID (LCID), belongs to a logical channel group (LCG), which in turn is identified by a LCG index. In a short buffer status report (BSR) from a UE to eNB, the amount of data for one LCG is indicated. In a long BSR, the amount of data for each LCG is indicated. Hence the eNB is aware of the buffered data amount at each LCG at a UE. When an eNB sends an uplink grant to a UE, the eNB can choose the LBT parameter set that will be used by the UE according to the intended LCG index. As there are four LCGs, a mapping between the logical channel prioritization (LCP) for each LCG to a corresponding CAPC can be defined, as depicted in FIG. 8. In other words, the CAPC of a MAC PDU is determined by the priority values assigned to each logical channel that constitute the MAC PDU. Such mapping between LCP and CAPC can be configured in the 3GPP specification, or be signaled in broadcast or by dedicated RRC signaling, or by NAS messaging.

PUSCH transmission can occupy a single subframe or occupy multiple subframes. For legacy LTE uplink, eNB performs UL grant subframe by subframe. In LAA, consecutive multiple subframe grant is introduced. Assume LBT is performed only the first subframe, the UE has to determine both CAPC and duration of transmission, which may be linked due to MCOT restrictions. In a first LCP (logic channel prioritization) mechanism #1, the UE uses CAPC (C) and duration (T) as input, assuming each logical channel is associated with a CAPC value that is mapped from QCI, LCP, or from direct configuration. The UE forms MAC PDU according to the following rules: 1) fill the grant as much as possible with data from logical channels configured with CAPC value lower (i.e., higher QoS) than that indicated by the eNB; 2) if the grant is not exhausted, use data from lower QoS logical channels in order of priority. In a second LCP mechanism #2, the UE uses duration (T) as input, and forms MAC PDU for grant corresponding to T rather than one subframe, assuming CAPC is also determined from QCI, LCP, or from direct configuration.

Figure 9:
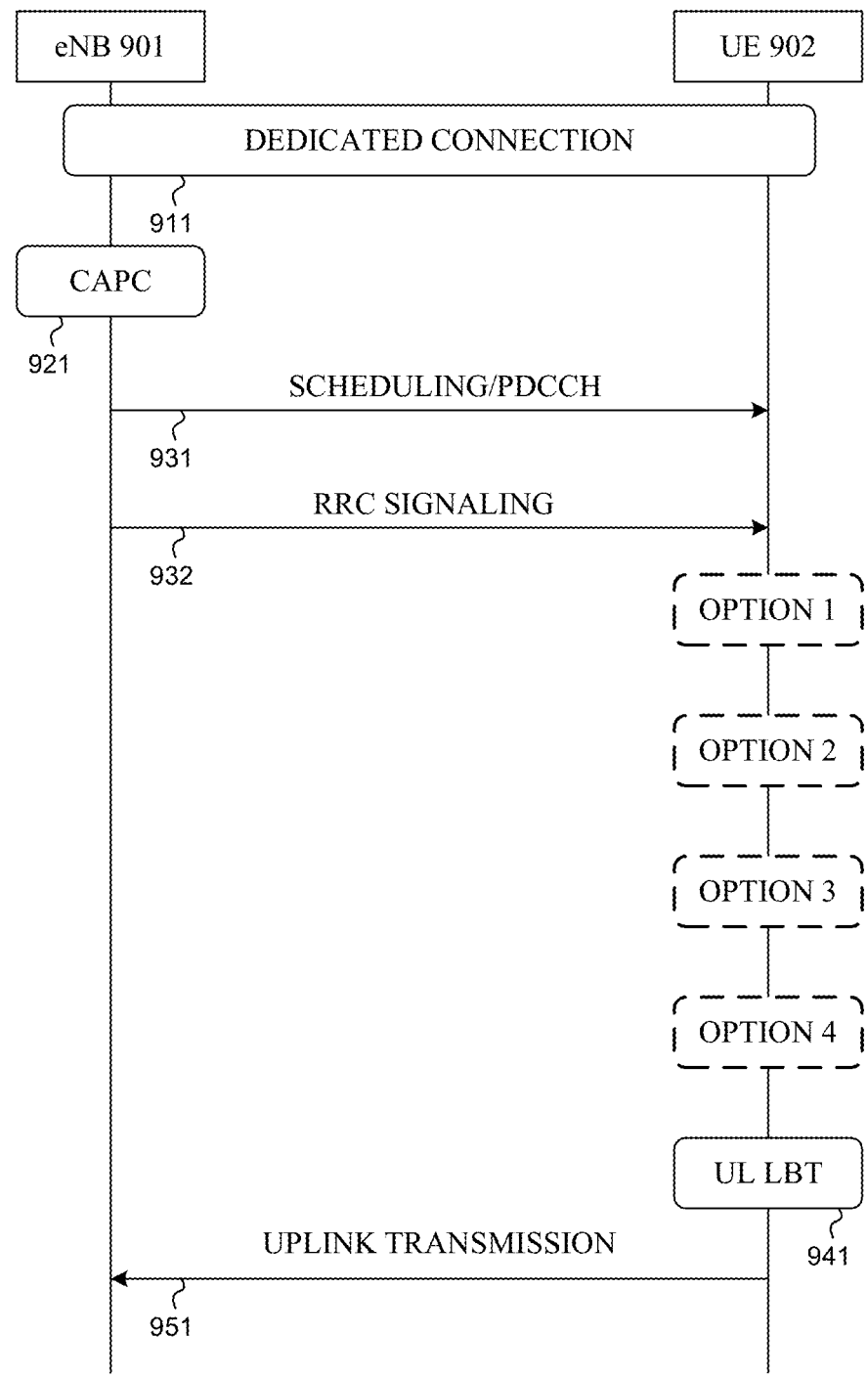
FIG. 9 illustrates one embodiment of multiple subframe PUSCH transmission and QoS provisioning in accordance with one novel aspect.

FIG. 9 illustrates one embodiment of multiple subframe PUSCH transmission and QoS provisioning in accordance with one novel aspect. For a multi-subframe transmission, an eNB can indicate CAPC only, duration of transmission only, both CAPC and duration, or neither CAPC nor duration (just when the UL can start). When only CAPC or duration is indicated, the other parameter needs to be determined by the UE. If CAPC is indicated, duration can be limited by MCOT for the value of CAPC or data available. If Duration is indicated, CAPC may be implicitly indicated, or worst CAPC assumed, or based on MAC contents. The rules defining MCOT per CAPC can be either defined in LTE specification or signaled via RRC.

In step 911, a base station eNB 901 and a user equipment UE 902 establishes a dedicated connection with each other. For example, the dedicated connection is a dedicated radio bearer (DRB) associated a quality class identifier (QCI). Each DRB has a one-to-one mapping to a logical channel belonging to a logical channel group (LCG). In step 921, eNB 901 determines the CAPC for UE 902 for LBT parameters to be applied in the subsequent uplink transmission. For example, the CAPC can be determined based on the QCI of the DRB or based on the MAC layer logical channel prioritization (LCP). In step 931, eNB 901 sends uplink scheduling information to UE 902 over a PDCCH. The PDCCH may carry the CAPC information and/or the duration information. Alternatively, the base station configures the CAPC as part of logic channel configuration that is sent to the UE via radio resource control (RRC) signaling (step 932).

Upon receiving the uplink scheduling, UE 902 needs to determine the LBT parameters accordingly. In a first option, the UE receives CAPC as well as duration. The UE can use LCP mechanism #1 to determine MAC PDU. If MAC PDU only contains data of lower QoS than indicated CAPC, then the UE uses the CAPC value corresponding to the most QoS sensitive data present. In a second option, the UE only receives CAPC without duration, which can be assumed to be equal to MCOT for indicated CAPC. UE can use LCP mechanism #2 to determine MAC PDU. In a third option, the uplink scheduling indicates duration only. The UE can determine CAPC to be the best CAPC value for which MCOT is greater than or equal to the indicated duration T. The UE then can use LCP mechanism #1 or #2 to determine MAC PDU. In a fourth option, the eNB indicates neither CAPC nor duration. The UE can determine CAPC to be the CAPC of the most QoS sensitive logical channel with data available for transmission, and choose duration T to be the MCOT corresponding to the CAPC. The UE then can use LCP mechanism #1 or #2 to determine MAC PDU. In step 941, UE 402 starts to initiate uplink transmission by performing an uplink LBT procedure. The LBT procedure is applied with a set of LBT parameters that is associated with the CAPC. In step 951, upon LBT completion, UE 902 transmits uplink data in one or multiple subframes over PUSCH.

Figure 10:
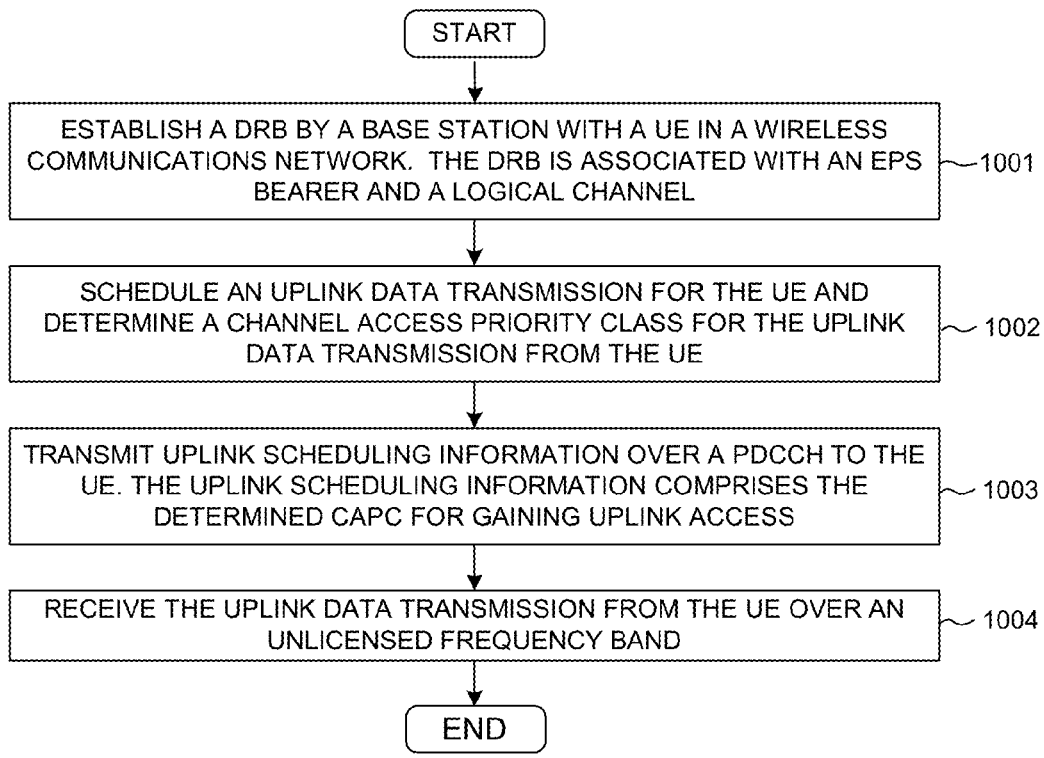
FIG. 10 is a flow chart of a method of channel access procedure and QoS provisioning from base station perspective in accordance with a novel aspect.

FIG. 10 is a flow chart of a method of channel access procedure and QoS provisioning from base station perspective in accordance with a novel aspect. In step 1001, a base station establishes a data radio bearer (DBR) with a user equipment (UE) in a wireless communications network. The DBR is associated with an Evolved Packet System (EPS) bearer and a logical channel. In step 1002, the base station schedules an uplink data transmission for the UE, and determining a channel access priority class (CAPC) for the uplink data transmission from the UE. In step 1003, the base station transmits uplink scheduling information over a physical downlink control channel (PDCCH) to the UE. The uplink scheduling information comprises the determined CAPC. In step 1004, the base station receives the uplink data transmission from the UE over an unlicensed frequency band.

Figure 11:
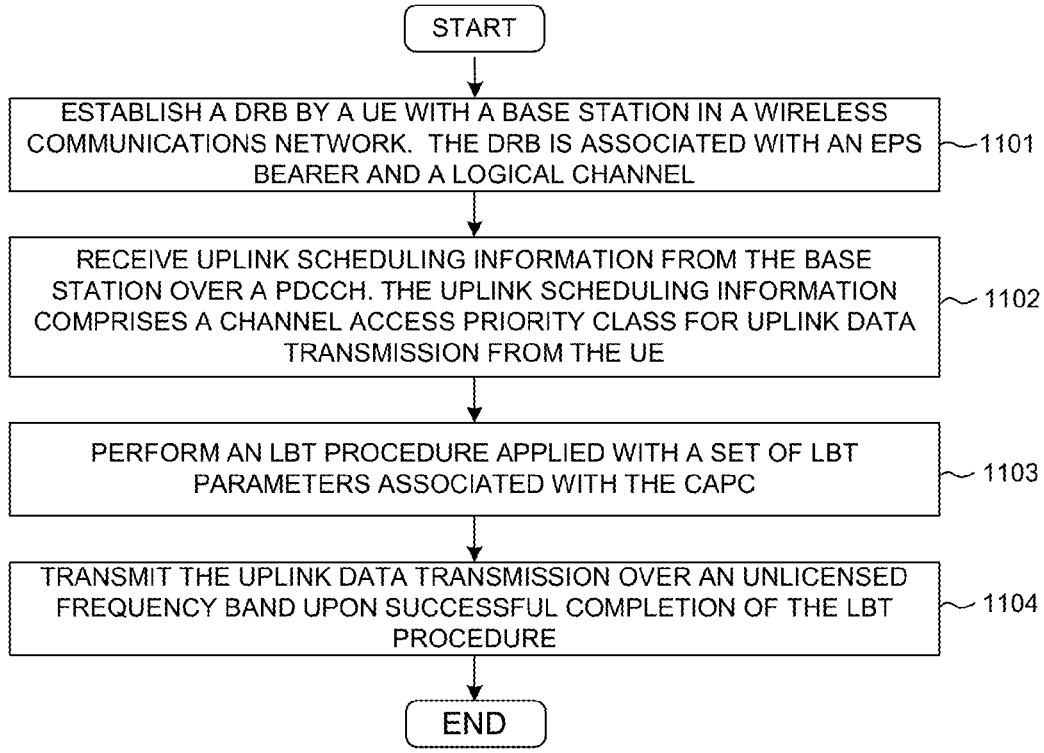
FIG. 11 is a flow chart of a method of channel access procedure and QoS provisioning from UE perspective in accordance with a novel aspect.

FIG. 11 is a flow chart of a method of channel access procedure and QoS provisioning from UE perspective in accordance with a novel aspect. In step 1101, a user equipment (UE) establishes a data radio bearer (DBR) with a base station in a wireless communications network. The DBR is associated with an Evolved Packet System (EPS) bearer and a logical channel. In step 1102, the UE receives uplink scheduling information from the base station over a physical downlink control channel (PDCCH). The uplink scheduling information comprises a channel access priority class (CAPC) for uplink data transmission from the UE. In step 1103, the UE performs a listen before talk (LBT) procedure applied with a set of LBT parameters associated with the CAPC. In step 1104, the UE transmits the uplink data transmission over an unlicensed frequency band upon successful completion of the LBT procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
  establishing a data radio bearer (DBR) by a base station with a user equipment (UE) in a wireless communications network, wherein the DBR is associated with an Evolved Packet System (EPS) bearer and a logical channel;
  scheduling an uplink data transmission for the UE, and determining a channel access priority class (CAPC) for the uplink data transmission from the UE;
  transmitting uplink scheduling information over a physical downlink control channel (PDCCH) to the UE, wherein the uplink scheduling information comprises the determined CAPC for gaining uplink access; and
  receiving the uplink data transmission from the UE over an unlicensed frequency band.

2. The method of claim 1, wherein the EPS bearer has a QoS profile that includes a Quality Class Identifier (QCI), and wherein the CAPC is mapped from the QCI.

3. The method of claim 1, wherein the logical channel belongs to a logical channel group (LCG) assigned with a logical channel prioritization (LCP), and wherein the CAPC is mapped from the LCP.

4. The method of claim 1, wherein the base station configures the CAPC as part of logic channel configuration that is sent to the UE via radio resource control (RRC) signaling.

5. The method of claim 1, wherein the uplink data transmission is over multiple subframes, and wherein the uplink scheduling information comprises both CAPC and a duration of the uplink data transmission.

6. The method of claim 1, wherein the uplink data transmission is over multiple subframes, and wherein the uplink scheduling information does not comprise a duration of the uplink data transmission.

7. A method comprising:
  establishing a data radio bearer (DBR) by a user equipment (UE) with a base station in a wireless communications network, wherein the DBR is associated with an Evolved Packet System (EPS) bearer and a logical channel;
  receiving uplink scheduling information from the base station over a physical downlink control channel (PDCCH), wherein the uplink scheduling information comprises a channel access priority class (CAPC) for uplink data transmission from the UE;
  performing a listen before talk (LBT) procedure applied with a set of LBT parameters associated with the CAPC; and
  transmitting the uplink data transmission over an unlicensed frequency band upon successful completion of the LBT procedure.

8. The method of claim 7, wherein the EPS bearer has a QoS profile that includes a Quality Class Identifier (QCI), and wherein the CAPC is mapped from the QCI.

9. The method of claim 7, wherein the logical channel belongs to a logical channel group (LCG) assigned with a logical channel prioritization (LCP), and wherein the CAPC is mapped from the LCP.

10. The method of claim 7, wherein the UE receives the CAPC as part of logic channel configuration via radio resource control (RRC) signaling.

11. The method of claim 7, wherein the LBT procedure involves clear channel sending (CCA), wherein the set of LBT parameters comprises a CCA defer period and a CCA contention window size.

12. The method of claim 7, wherein the uplink data transmission is over multiple subframes, and wherein the UE forms MAC PDU filled with data from logical channels configured with priorities lower than or equal to a priority associated with the CAPC.

13. The method of claim 7, wherein the uplink data transmission is over multiple subframes, and wherein the UE determines a duration of the uplink data transmission to be a maximum channel occupancy time (MCOT).

14. A user equipment (UE) comprising:
- a radio bearer handling circuit that establishes a data radio bearer (DBR) by a user equipment (UE) with a base station in a wireless communications network, wherein the DBR is associated with an Evolved Packet System (EPS) bearer and a logical channel;
- a radio frequency (RF) receiver that receives uplink scheduling information from the base station over a physical downlink control channel (PDCCH), wherein the uplink scheduling information comprises a channel access priority class (CAPC) for uplink data transmission from the UE; and
- a channel access circuit that performs a listen before talk (LBT) procedure applied with a set of LBT parameters associated with the CAPC; and
- an RF transmitter that transmits the uplink data transmission over an unlicensed frequency band upon successful completion of the LBT procedure.

15. The UE of claim 14, wherein the EPS bearer has a QoS profile that includes a Quality Class Identifier (QCI), and wherein the CAPC is mapped from the QCI.

16. The UE of claim 14, wherein the logical channel belongs to a logical channel group (LCG) assigned with a logical channel prioritization (LCP), and wherein the CAPC is mapped from the LCP.

17. The UE of claim 14, wherein the UE receives the CAPC as part of logic channel configuration via radio resource control (RRC) signaling.

18. The UE of claim 14, wherein the LBT procedure involves clear channel sending (CCA), wherein the set of LBT parameters comprises a CCA defer period and a CCA contention window size.

19. The UE of claim 14, wherein the uplink data transmission is over multiple subframes, and wherein the UE forms MAC PDU filled with data from logical channels configured with priorities lower than or equal to a priority associated with the CAPC.

20. The UE of claim 14, wherein the uplink data transmission is over multiple subframes, and wherein the UE determines a duration of the uplink data transmission to be a maximum channel occupancy time (MCOT).

* * * * *

UNITED STATES PATENT AND TRADEMARK OFFICE
CERTIFICATE OF CORRECTION

PATENT NO. : 10,045,376 B2  
APPLICATION NO. : 15/433492  
DATED : August 7, 2018  
INVENTOR(S) : Weidong Yang et al.

Page 1 of 1

It is certified that error appears in the above-identified patent and that said Letters Patent is hereby corrected as shown below:

In the Claims

Column 9, Line 60 and Line 62, the words "DBR" should be changed to --DRB--

Column 10, Line 28 and Line 30, the words "DBR" should be changed to --DRB--

Column 11, Line 3 and Line 5, the words "DBR" should be changed to --DRB--

Signed and Sealed this
Twenty-sixth Day of November, 2019

Andrei Iancu
*Director of the United States Patent and Trademark Office*